United States Patent
K. S et al.

(10) Patent No.: US 11,136,194 B2
(45) Date of Patent: Oct. 5, 2021

(54) MOTORIZED CONVEYOR ROLLER WITH DRIVE ASSEMBLY

(71) Applicant: INTELLIGRATED HEADQUARTERS, LLC, Mason, OH (US)

(72) Inventors: Sathiyanarayanan K. S, Morris Plains, NJ (US); Shakil Moonamkandy, Morris Plains, NJ (US); Balaji K. Krishnaswamy, Morris Plains, NJ (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 16/811,055

(22) Filed: Mar. 6, 2020

(65) Prior Publication Data

US 2020/0346868 A1    Nov. 5, 2020

(30) Foreign Application Priority Data

Mar. 8, 2019   (IN) .............................. 201911009044

(51) Int. Cl.
*B65G 13/073* (2006.01)
*B65G 13/11* (2006.01)

(52) U.S. Cl.
CPC ............ *B65G 13/073* (2013.01); *B65G 13/11* (2013.01); *B65G 2811/09* (2013.01)

(58) Field of Classification Search
CPC .... B65G 13/073; B65G 13/11; B65G 2811/09
(Continued)

(56) References Cited

U.S. PATENT DOCUMENTS

| 7,618,352 B1 * | 11/2009 | Wei .................... A63B 22/0257 198/788 |
| 8,381,901 B2 * | 2/2013 | Yamamoto ............. B65G 23/08 198/789 |

(Continued)

FOREIGN PATENT DOCUMENTS

| CN | 1538594 A | 10/2004 |
| CN | 102320454 A | 1/2012 |

(Continued)

OTHER PUBLICATIONS

Notification of Publication of Patent Application for Invention and Entering Into the Substantive Examination Proceeding issued in Chinese Application No. 202010159346.1 dated Sep. 21, 2020, 2 pages.

(Continued)

*Primary Examiner* — Gene O Crawford
*Assistant Examiner* — Lester Ill Rushin
(74) *Attorney, Agent, or Firm* — Alston & Bird LLP (57) ABSTRACT

A conveyor roller includes a roller tube, a motor assembly comprising a motor and a motor shaft and a drive assembly engaged with the motor assembly and the roller tube. The drive assembly includes a drive member, a connector, and a sleeve. The drive member includes at least one first slot that axially extends from a front face of the drive member towards a rear face. The connector includes an axial opening and at least one first projection extending radially outwardly. A sleeve disposed at least partially between the connector and the drive member. The sleeve is configured to engage the at least one first slot of the drive member and the at least one first projection of the connector. A portion of the sleeve extends radially outwardly of the drive member, such that the portion of the sleeve is configured to engage an inner surface of the roller tube.

28 Claims, 6 Drawing Sheets

(58) Field of Classification Search
USPC .......................................................... 198/791
See application file for complete search history.

(56) References Cited

U.S. PATENT DOCUMENTS

| | | | |
|---|---|---|---|
| 10,926,959 B2* | 2/2021 | Lindemann | ............ B65G 13/06 |
| 2004/0112718 A1* | 6/2004 | Brixius | .................. F16B 21/09 |
| | | | 198/788 |
| 2011/0062000 A1 | 3/2011 | Shinya | |

FOREIGN PATENT DOCUMENTS

| | | |
|---|---|---|
| DE | 102015120922 A1 | 10/2016 |
| DE | 202017006722 U1 | 3/2018 |
| EP | 1260725 A3 | 2/2003 |
| JP | 60-122614 A | 7/1985 |
| WO | 2009/139068 A1 | 11/2009 |

OTHER PUBLICATIONS

Extended European Search Report for Patent Application No. 20161645.5 dated Aug. 28, 2020, 7 pages.
Office Action issued in Chinese Application No. 202010159346.1 dated Apr. 26, 2021, 9 pages.

* cited by examiner

MOTORIZED CONVEYOR ROLLER WITH DRIVE ASSEMBLY

CROSS-REFERENCE TO RELATED APPLICATIONS

This specification is based upon and claims the benefit of priority from Indian patent application number IN 201911009044 filed on Mar. 8, 2019, the entire contents of which are incorporated herein by reference.

TECHNICAL FIELD

The present disclosure relates in general to motorized conveyor roller used in a conveyor roller section of a conveyor system, and, more specifically, relates to a drive assembly of the motorized conveyor roller employed in the conveyor roller section of the conveyor system.

BACKGROUND

Conventional conveyor systems and assemblies may include a conveyor bed and carriers in the form of conveyor rollers or belts supported on a conveyor frame of the conveyor bed. The carriers are often used for supporting and transporting objects in industrial and manufacturing contexts. An example conveyor system or assembly may include a sorter conveyor system, a merge conveyor system, an accumulation conveyor system, an induction conveyor system, or the like. These conveyor assemblies are often divided into zones. Each zone may include a set of motorized and non-motorized conveyor rollers. The set of motorized and non-motorized conveyor rollers are often overrun by conveyor belts. The set of motorized rollers drive the non-motorized rollers, for example, though drive bands. The set of motorized conveyor rollers accumulate articles on each zone, or move articles in the direction of travel. Each of the motorized conveyor rollers in each zone of the conveyor assembly may include one or more components fixed internally in each of the motorized conveyor rollers. Several designs and arrangements have been proposed for the components existing inside these motorized rollers. However, Applicant has identified a number of deficiencies and problems associated with the design and arrangement of the components inside these motorized rollers. Through applied effort, ingenuity, and innovation, many of these identified problems have been solved by developing solutions that are included in embodiments of the present disclosure, many examples of which are described in detail herein.

BRIEF SUMMARY OF SOME EXAMPLE EMBODIMENTS

The following presents a simplified summary in order to provide a basic understanding of some aspects of the disclosed conveyor system. This summary is not an extensive overview and is intended to neither identify key or critical elements nor delineate the scope of such elements. Its purpose is to present some concepts of the described features in a simplified form as a prelude to the more detailed description that is presented later.

Various aspects described herein relate to a conveyor roller. In an example embodiment, the conveyor roller includes a roller tube, a motor assembly including a motor and a motor shaft, and a drive assembly engaged with the motor assembly and the roller tube to transmit torque between the motor assembly and the roller tube. The drive assembly includes a drive member, a connector, and a sleeve. The drive member includes at least one first slot, the at least one first slot axially extends from a front face of the drive member towards a rear face of the drive member. The connector has an axial opening and at least one first projection extending radially outwardly, the axial opening receives the motor shaft. The sleeve disposed at least partially between the connector and the drive member, the sleeve is configured to engage the at least one first slot of the drive member and the at least one first projection of the connector. The sleeve is configured to transmit the torque between the connector and the drive member. Further, a portion of the sleeve extends radially outwardly of the drive member, such that the portion of the sleeve is configured to engage an inner surface of the roller tube.

Various aspects described herein relate to a conveyor roller wherein the drive member further includes at least one second slot, the second slot extends from an inner cavity of the drive member to a radially outward surface of the drive member. The second slot is configured to receive the portion of the sleeve therein.

Various aspects described herein relate to a conveyor roller wherein the second slot axially extends from the front face of the drive member towards the rear face of the drive member. The second slot is positioned radially outwardly relative to the at least one first slot and connects the at least one first slot with the radially outward surface of the drive member.

Various aspects described herein relate to a conveyor roller wherein the sleeve further includes at least one second projection, wherein the at least one second projection is configured to engage the at least one first slot of the drive member.

Various aspects described herein relate to a conveyor roller wherein the second projection includes a plurality of second projections. The plurality of second projections includes second plural pairs of crest portions and trough portions disposed alternately about the sleeve.

Various aspects described herein relate to a conveyor roller wherein the portion of the sleeve comprises a plurality of third projections formed on each of the crest portions of the plurality of second projections.

Various aspects described herein relate to a conveyor roller wherein the portion of the sleeve comprises at least one third projection, wherein the at least one third projection extending radially outwardly away from the axial opening of the connector.

Various aspects described herein relate to a conveyor roller wherein the sleeve further comprises at least one third slot configured to engage the at least one first projection of the connector, at least one second slot of the drive member is configured to engage the at least one third projection. The respective ones of the at least one first projection, the at least one third slot, the at least one second projection, the at least one first slot, the at least one third projection, and the at least one second slot are circumferentially aligned along a radial axis.

Various aspects described herein relate to a conveyor roller at least one pin, wherein the drive member comprises at least one drive pin opening. The roller tube includes at least one roller pin opening, the at least one pin engages both the at least one drive pin opening and the at least one roller pin opening to rotationally lock the drive member relative to the roller tube.

Various aspects described herein relate to a conveyor roller with at least one first slot including a plurality of first slots that include first plural pairs of crest portions and trough portions disposed alternately on a radial inner surface of the drive member.

Various aspects described herein relate to a conveyor roller with a plurality of second slots formed on each of the crest portions of the plurality of first slots.

Various aspects described herein relate to a conveyor roller, wherein the sleeve defines a density that is less than a density of the drive member and more than a density of the connector.

Various aspects described herein relate to a conveyor roller, wherein, wherein the sleeve is interference fit within the roller tube, and the drive member defines a diameter less than a diameter of the sleeve and less than a diameter of the inner surface of the roller tube.

Various aspects described herein relate to a conveyor roller with at least a portion of the drive member and at least a portion of the connector disposed at a same radial distance within a plane perpendicular to an axis of the drive assembly.

Various aspects described herein relate to a drive assembly, such as one used in a conveyor roller, configured to be engaged with a motor assembly and a roller tube to transmit torque between the motor assembly and the roller tube. In an example embodiment, the drive assembly includes a drive member, a connector, and a sleeve. The drive member includes at least one first slot, wherein the at least one first slot axially extends from a front face of the drive member towards a rear face of the drive member. Further, the connector includes an axial opening and at least one first projection extending radially outwardly. The axial opening receives a motor shaft. The sleeve disposed at least partially between the connector and the drive member, the sleeve is to engage the at least one first slot of the drive member and the at least one first projection of the connector. The sleeve is configured to transmit the torque between the connector and the drive member. A portion of the sleeve extends radially outwardly of the drive member, such that the portion of the sleeve is configured to engage an inner surface of the roller tube.

Various aspects described herein relate to the drive member including at least one second slot. The at least one second slot extends from an inner cavity of the drive member to a radially outward surface of the drive member, the at least one second slot is configured to receive the portion of the sleeve therein.

Various aspects described herein relate to the at least one second slot that axially extends from the front face of the drive member towards the rear face of the drive member. The at least one second slot is positioned radially outwardly relative to the at least one first slot and connects the at least one first slot with the radially outward surface of the drive member.

Various aspects described herein relate to the sleeve including at least one second projection, the at least one second projection is configured to engage the at least one first slot of the drive member.

Various aspects described herein relate to the sleeve including the at least one second projection which further includes a plurality of second projections, the plurality of second projections includes second plural pairs of crest portions and trough portions disposed alternately about the sleeve.

Various aspects described herein relate to the sleeve with the portion of the sleeve including a plurality of third projections formed on each of the crest portions of the plurality of second projections.

Various aspects described herein relate to the portion of the sleeve including at least one third projection, wherein the at least one third projection extending radially outwardly away from the axial opening of the connector.

Various aspects described herein relate to the sleeve which further comprises at least one third slot configured to engage the at least one first projection of the connector, at least one second slot of the drive member is configured to engage the at least one third projection. The respective ones of the at least one first projection, the at least one third slot, the at least one second projection, the at least one first slot, the at least one third projection, and the at least one second slot are circumferentially aligned along a radial axis.

Various aspects described herein relate to the drive assembly with at least one first slot including a plurality of first slots that include first plural pairs of crest portions and trough portions disposed alternately on a radial inner surface of the drive member.

Various aspects described herein relate to the drive assembly which further includes a plurality of second slots formed on each of the crest portions of the plurality of first slots.

Various aspects described herein relate to the sleeve which defines a density that is less than a density of the drive member and more than a density of the connector.

Various aspects described herein relate to the sleeve which has an interference fit within the roller tube, the drive member defines a diameter less than a diameter of the sleeve and less than diameter of the inner surface of the roller tube.

Various aspects described herein relate to at least a portion of the drive member and at least a portion of the connector are disposed at a same radial distance within a plane perpendicular to an axis of the drive assembly.

Various aspects described herein relate to a method of assembling a conveyor roller. The method includes providing a roller tube with a hollow inner portion. Further, the method includes inserting a drive assembly including at least one radially extending portion inside the hollow inner portion and aligning a drive pin opening on the drive assembly with a roller pin opening on the roller tube. After aligning the openings, attaching the drive assembly and the roller tube with at least one connector pin through the roller pin opening and the drive pin opening to lock the drive assembly relative to the roller tube. Further, the method includes inserting a motor assembly inside the hollow inner portion to position the motor assembly at a first end. The motor assembly is coupled with the drive assembly. The motor assembly includes a first mounting shaft. The method includes inserting a second mounting shaft including a spring housing inside the hollow inner portion to position the second mounting shaft at a second end of the roller tube. Attaching a bearing housing assembly between at least one of the first mounting shaft and the second mounting shaft, on the one hand, and an inner circumferential surface of the roller tube, on the other hand, to allow the roller tube to rotate.

Various aspects described herein relate to a method of assembling a conveyor roller. The method includes assembling the drive assembly by providing a drive member, the drive member including at least one first slot, wherein the at least one first slot axially extends from a front face of the drive member towards a rear face of the drive member. Providing a connector, the connector including an axial opening and at least one first projection extending radially outwardly. The axial opening receives a motor shaft. Further, the method includes disposing a sleeve at least partially between the connector and the drive member, wherein the sleeve is configured to engage the at least one first slot of the drive member and the at least one first projection of the connector. The sleeve is configured to transmit the torque between the connector and the drive member. A portion of the sleeve defines the at least one radially extending portion extends.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present disclosure will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The terms "substantially" and "approximately" are used herein to refer to within engineering and/or manufacturing standards.

As used herein, the terms "conveyor section," "conveyor bed," "conveyor assembly/system," and similar terms may be used interchangeably to refer to a conveyor capable of conveying articles within a material handling system in accordance with embodiments of the present disclosure. Thus, use of any such terms should not be taken to limit the spirit and scope of embodiments of the present disclosure.

The word "exemplary," when used herein, is intended to mean "serving as an example, instance, or illustration." Any implementation described herein as "exemplary" is not necessarily preferred or advantageous over other implementations.

The term "downstream direction" is used herein to refer a transport direction of the articles conveyed on the conveyor. In this regard "transport direction" is used herein to refer to a direction of travel of the articles on the conveyor from a source to a destination. The term "upstream direction" is used herein to refer to a direction opposite of the transport direction.

A motorized conveyor roller according to some embodiments discussed herein may generally have two main drive components including a motor assembly and a drive assembly, which drive a roller tube. These assemblies may have one or more components that are arranged in various configurations on an inner portion of the motorized conveyor roller. In some embodiments, the drive assembly may be fixed relative to the roller tube, as discussed herein, while the motor assembly is fixed relative to a frame supporting the roller tube, such that the motor assembly may be configured to rotate the drive assembly and roller tube. In some embodiments, the inner portion of non-motorized conveyor rollers may be hollow through which axles are passed with a clearance to the conveyor rollers. Similarly, for the motorized conveyor roller, the inner portion of the roller tube may be a hollow space in which the components of the motor assembly and the drive assembly may be arranged. When assembling the components of the motorized conveyor roller, the components may be arranged or fit to each other in a manner that the torque of the drive components and any vibration caused due to sudden start and stop of the motorized conveyor roller do not affect the relative positioning of components inside the motorized conveyor roller or the effective energy transfer between the drive components and the roller tube (e.g., to avoid slippage between the drive components and the roller).

One example arrangement used for limiting the vibration may be to provide some extra attachments on these components or to provide a carefully sized, rigid external diameter, such that at least a portion of the drive components (e.g., the drive assembly) tightly fit against inner wall of the roller tube of the motorized conveyor roller to limit the vibration or slippage of the components during normal operation of the motorized conveyor roller. However, such arrangement may pose one or more disadvantages, such as, but not limited to, damaging the components or other difficulties during assembly caused by the amount of force required to push each component of the motor assembly and/or the drive assembly through the hollow space of the roller tube to cause the tight fit on the inner wall of the roller tube. The use of the extra attachments may increase the number of components being placed into the roller tube and results in increase in weight of the roller tube, which in turn may cause the motor assembly draw more power to drive the motorized conveyor roller.

In an example, when the extra attachments that hold the drive components are removed and the components of the drive assembly and/or the motor assembly are constructed in a profile which may accommodate the components inside the roller tube with a tight fit against the inner wall of the roller tube, then the extra force applied to these components when inserting into the roller tube may cause shearing stress to the components which results in damage or failure of the motorized conveyor roller. Furthermore, when inserting the components of drive assembly into the roller tube, it is intended to maintain the drive assembly at a desired position inside the roller tube, thereby, applying excessive force to insert the components may cause slipping of these components out of the roller tube or may lead to misalignment from its desired position. Likewise, because the inventors intend to maintain the drive assembly at a desired position inside the roller tube during and after insertion, for example to prevent misalignment or difficulty engaging the various drive components, it is desirable to not allow at least the drive assembly to freely float in the roller tube. In addition, the components of the drive assembly and the inner wall of the roller tube may be of metal material which may cause wear of the components when in contact against the inner wall. Further, metal to metal contact between the roller tube and the components may lead to increase in noise during operation of the motorized conveyor roller.

Further, since conveyor rollers are primarily load bearing members, utilized in environments where huge shock loads, for example, dropping of products onto the conveyor rollers) may occur, alignment of the components inside the roller tube must be precise and accurate if the conveyor rollers are to perform satisfactorily over a prolonged service life.

Through applied effort, ingenuity, and innovation, many of the above identified problems have been solved by developing solutions that are included in embodiments of the present disclosure, many examples of which are described in detail herein. Various embodiments of the present disclosure relate to a conveyor roller which may include a roller tube, a motor assembly, and a drive assembly that may be connected to the roller tube and engaged with the motor assembly for driving the conveyor roller. In some embodiments, as discussed herein, the drive assembly may include one or more means for resiliently holding the drive assembly in the roller tube during assembly in a manner that allows for the drive assembly to be inserted into the roller tube with reduced force. In some embodiments, the drive assembly may be fixed (e.g., via one or more pins or set screws) to the roller tube after insertion.

In some embodiments, the driving assembly includes a drive member, a connector, and a sleeve (e.g., an elastomer sleeve). The sleeve may be formed of a material, such as an elastomer material, that is deformable. The drive member may include one or more slots, and the connector may include one or more projections. The elastomer sleeve may include projections (e.g., two set of projections with one set of projections cut-out in a dimension to couple with projections on the connector, and the other set of projections to couple with the set of slots of the drive member) and/or slots configured to mate between the connector and drive member, and at least a portion of the sleeve may be the most radially-outward portion of the driving assembly. For example, in some embodiments, a portion of the other set of projections of the elastomer sleeve radially extends or protrudes out of the set of slots when coupled with the drive member, such that the sleeve may be disposed between the connector and the drive member while a portion of the sleeve also radially extends beyond both the connector and the drive member. These projections of the elastomer sleeve protruding out of the drive assembly may engage the inner wall of the roller tube when the components of the motorized drive roller are arranged inside the hollow space. The sleeve may form an interference fit with the inner wall of the roller tube, such that the sleeve may be configured to maintain the drive assembly resiliently in position without separate fasteners, at least temporarily, while the deformable properties of the sleeve reduce the force required to insert the drive assembly. During assembly, inserting the components of the motorized conveyor roller into the roller tube may cause portions of the sleeve (e.g., the projections of the sleeve) to deform, facilitating ease of insertion without any excessive force being applied to the components and the components may be slid thorough the roller tube and placed in a desired position without falling out of the roller tube or shifting within the tube since the sleeve holds the drive assembly intact against the inner wall of the roller tube. These projections or other portions of the sleeve may be an integral part of the sleeve and may exist as a single molded piece (e.g., molded elastomer) which in turn may obviate the need of additional attachments to each components of the motorized conveyor roller.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", "one or more embodiments," or the like are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various elements are described which may be present for some embodiments but not other embodiments.

It is understood that the use of specific component, device and/or parameter names and/or corresponding acronyms thereof, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which a different element, feature, protocol, or concept name is utilized. Thus, each term utilized herein is to be given its broadest interpretation given the context in which that term is utilized.

Figure 1:
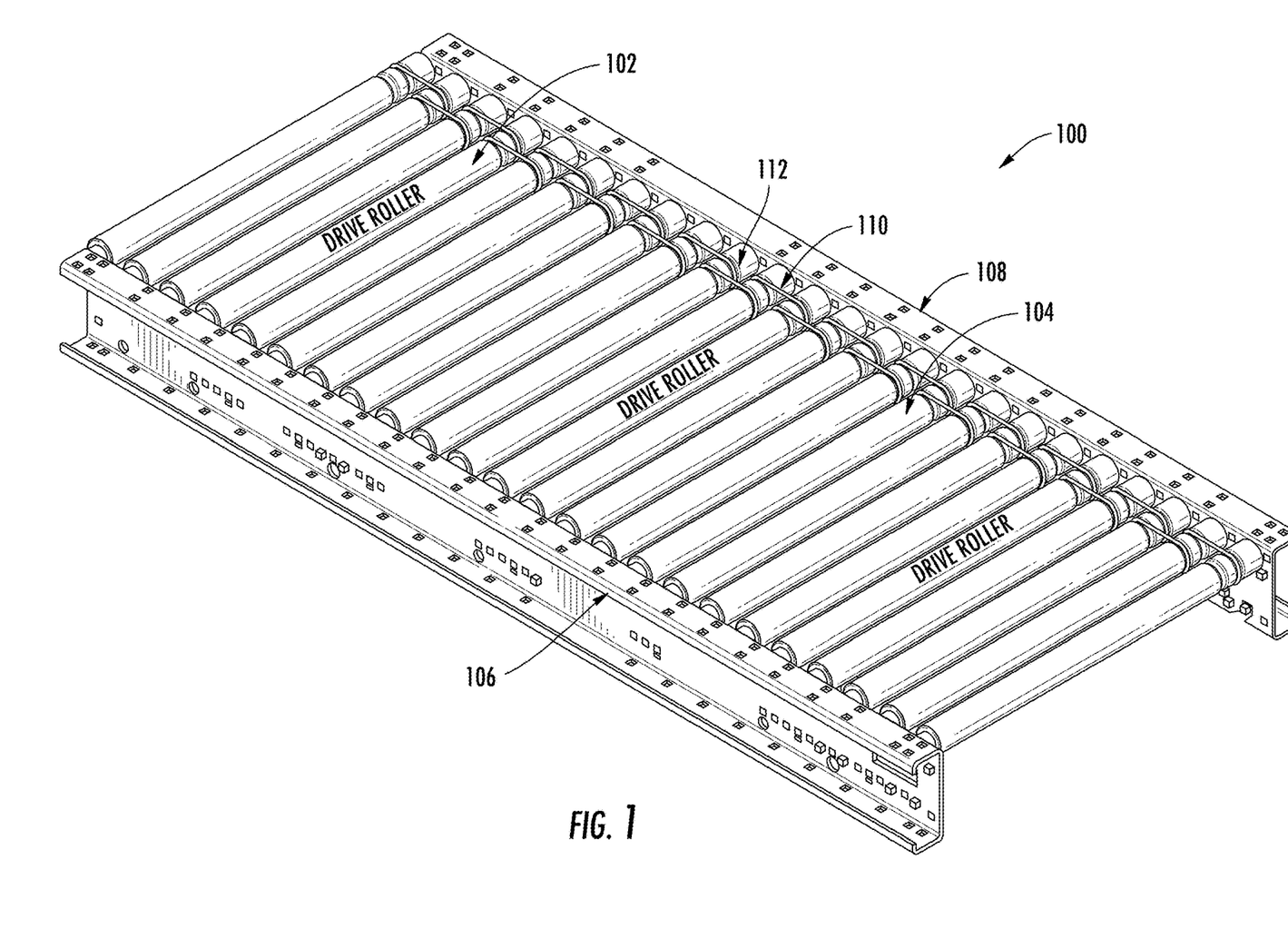
FIG. 1 illustrates a conveyor bed with motorized and non-motorized conveyor rollers, in accordance with one or more embodiments of the present disclosure.
Figure 2:
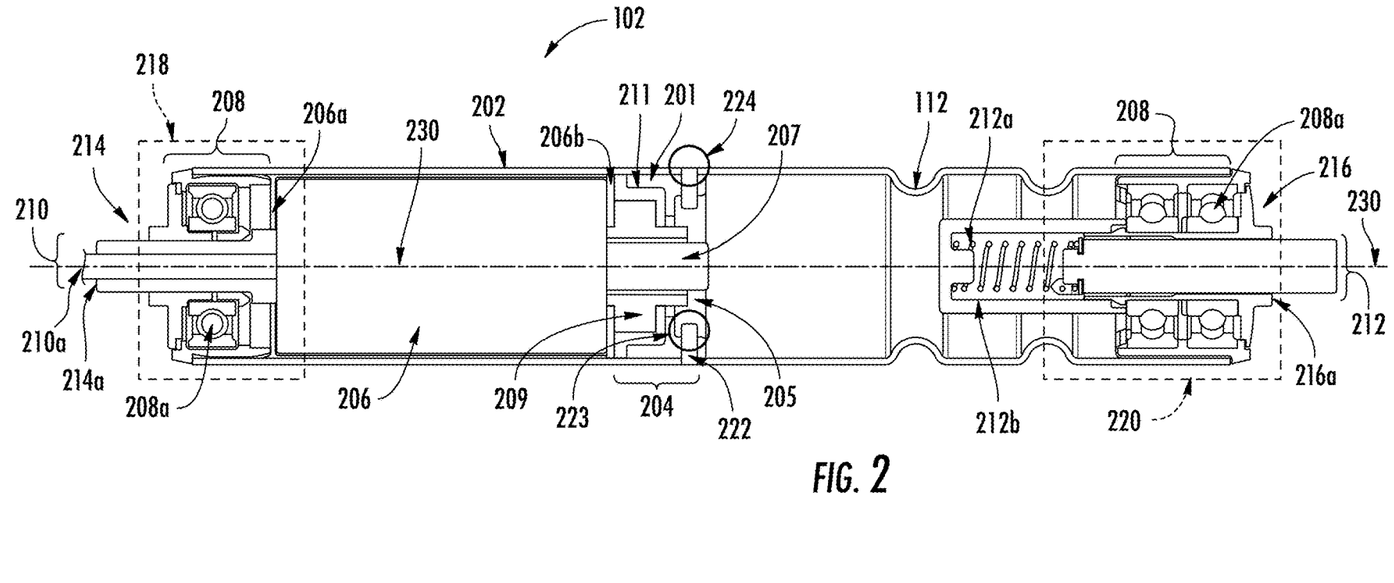
FIG. 2 illustrates a cross sectional view of the motorized conveyor roller of FIG. 1, in accordance with one or more embodiments of the present disclosure.

FIG. 1 illustrates a conveyor bed with motorized and non-motorized conveyor rollers, in accordance with one or more embodiments of the present disclosure. The conveyor bed 100, as shown in FIG. 1, illustrates one conveyor section or one conveyor zone, which may form one of the one or more conveyor sections of a conveyor system. According to an embodiment, one conveyor section may have one or more motorized conveyor rollers 102 and non-motorized conveyor rollers 104. In the embodiment depicted in FIG. 1, the conveyor bed 100 including a first rail 106, a second rail 108, and a set of conveyor rollers 102, 104 is disclosed. The depicted set of conveyor rollers 102, 104 are mechanically coupled to the first rail 106 and the second rail 108. The first rail 106 and the second rail 108 includes set of apertures (not shown) to receive the set of conveyor rollers 102, 104. For example, the set of apertures may be provided with a clearance to accommodate mounting shafts (as shown in FIG. 2) of the set of conveyor rollers 102, 104. According to an embodiment, the mounting shafts and the set of apertures may have the same profile. For example, if the mounting shafts have hexagonal shaped profile, the set of apertures may also have the same profile. Alternatively, the mounting shafts and the set of apertures may have different profiles. In some embodiments, such as the one shown in FIG. 1, the set of conveyor rollers include the non-motorized conveyor rollers 104 and the motorized conveyor rollers 102. The non-motorized conveyor rollers 104, for example, are referred to as idler rollers or driven rollers. The motorized conveyor rollers 102, for example, are referred to as drive rollers. The drive rollers are configured to drive the idler rollers. For example, the drive rollers may include drive bands 110 such as, but not limited to, O-drive bands to drive the idler rollers. In FIG. 1, the drive rollers and the idler rollers are connected to each other through a series of drive bands 110 in order to drive the idler rollers. Each of the drive bands 110 are reeved around a tracking ring 112 provided on the drive rollers and the idler rollers. The tracking ring 112, for example, ensures that the drive bands 110 do not slip out of the drive rollers and the idler rollers when operating at its full speed. The drive bands 110 are connected to idler pulleys (not shown) provided on either the first rail 106 or the second rail 108 of the conveyor bed 100 to maintain desired tension between the drive bands 110 and the set of conveyor rollers 102, 104. In FIG. 1, the motorized conveyor rollers 102 are placed in between the non-motorized conveyor rollers 104. Alternatively, the motorized conveyor rollers 102 may be placed at one or more positions on the conveyor bed 100, for example, at a downstream end or upstream end of the conveyor bed 100 as an end conveyor roller. The motorized conveyor rollers 102 may be controlled by motor controllers (not shown) which communicate with a programmable controller (not shown). The programmable controller (PC) may be an industrial PC which communicates with the motor controllers connected over a communication bus, for example, over a RS232 bus in order to set speed limit, set current limit, or set various modes of operation for the motorized conveyor rollers 102. The various modes of operation include, for example, a halt mode at which a brake may be activated to stop rotation of the set of conveyor rollers 102, 104.

FIG. 2 illustrates a cross sectional view of the motorized conveyor roller of FIG. 1, in accordance with one or more embodiments of the present disclosure. The motorized conveyor roller 102 includes one or more components, such as a roller tube 202, a drive assembly 204, a motor assembly 206, at least one bearing housing assembly 208, a first mounting shaft 210 and a second mounting shaft 212. The one or more components being arranged within the roller tube 202 and may be free floating or mounted on an inner circumferential surface 201 of the roller tube 202. The roller tube 202, for example, may made of either a metallic material or a reinforced plastic material. According to an embodiment, the roller tube 202 may be manufactured with the one or more components installed therein. According to another embodiment, the roller tube 202 may be only a hollow cylindrical tube with an opening extending throughout the length of the roller tube 202 and devoid of any components as previously discussed. Further, the roller tube 202 includes a first opening 214 and a second opening 216 through which the first mounting shaft 210 and the second mounting shaft 212 may be inserted respectively. According to an embodiment, the roller tube 202 may include one or more tracking rings 112 at one end of the roller tube 202. According to an embodiment, the roller tube 202 may include protective caps (not shown) affixed at opposite ends of the roller tube 202 with an intent to protect the one or more components inside the roller tube 202 against any foreign bodies, such as dust, water, debris or the like.

Further, in the depicted embodiment, the first mounting shaft 210 is provided at a first end 218 of the roller tube 202 and inserted into the roller tube 202 through the first opening 214. The first end 218, for example, may be the end connecting the roller tube 202 to the first rail 106 of the conveyor bed 100. Further, the first end 218 includes the first opening 214. The second mounting shaft 212 is shown at a second end 220 of the roller tube 202 and inserted into the roller tube 202 through the second opening 216. The second end 220, for example, may be the end connecting the roller tube 202 to the second rail 108 of the conveyor bed 100. Further, the second end 220 includes the second opening 216. The first end 218 and the second end 220 are opposing ends of the roller tube 202. In the depicted embodiment, the first mounting shaft 210 is hollow and an electrical conductor means 210a passes through the hollow of the first mounting shaft 210. The second mounting shaft 212 may include a spring 212a and a spring housing 212b. The spring 212a may be used during installation and replacement of the motorized conveyor roller 102 from the conveyor bed 100.

Further, the motor assembly 206 includes a motor (not shown), or alternatively a type of power generator, and a motor shaft 207. The motor, for example, may be a brushless direct current motor. In some embodiments, the speed of the roller tube may be affected by a gear reducer. A gear reducer (not shown) may be provided in the motor assembly to alter speed and torque requirements of the motorized conveyor roller 102. For example, the gear reducer may step down speed of the motor. According to an embodiment, the gear reducer may a three-stage reduction configuration having first to third simple planetary gear mechanisms, in which each of the simple planetary gear mechanisms may have a sun gear, a planetary gear, and a ring gear. The motor assembly has an outer face 206a and an inner face 206b. The motor assembly 206 is slid into the roller tube 202 using a fixture from the first end of the roller tube 202. The motor assembly 206 is assembled inside the roller tube 202 in such a manner that the outer face 206a of the motor assembly 206 faces the first end 218 of the roller tube 202 and the inner face 206b of the motor assembly 206 faces the second end 220 of the roller tube 202. A portion of the motor shaft 207 protrudes out from the inner face 206b of the motor assembly 206. The outer face 206a of the motor assembly 206 receives the first mounting shaft 210 along with the electrical conductor means 210a. For example, the electrical conductor means 210a may pass through the hollow of the first mounting shaft 210 to provide an electrical path between the positive terminal of the motor and an external power source (not shown). The motor assembly 206 may be fixed to the first mounting shaft 210 by any suitable means, such as a screw or the like, such that the motor, apart from the motor shaft 207 and internal components, the mounting shaft 210, and the electrical conductor means 210a remain stationary and non-rotating while the roller tube 202 rotates.

Further, in some embodiments, the conveyor roller may include one or more bearing housing assemblies 208. In some embodiments, the conveyor roller may include roller bearings 208a configured to enable the motorized conveyor roller 102 to rotate about its axis 230. According to an embodiment, at least one bearing housing assembly 208 may be provided at both the first end 218 and the second end 220 of the roller tube 202. According to another embodiment, the bearing housing assembly 208 may be provide at either the first end 218 or the second end 220 of the roller tube 202. According to an embodiment, the bearing housing assembly 208 at the first end 218 and the second end 220 of the roller tube 202 may have identical construction, for example, the first end 218 and the second end 220 of the roller tube 202 may each have an identical configuration and an equal number of roller bearings 208a.

In the example embodiment shown in FIG. 2, the bearing housing assembly 208 at the first end 218 includes lesser roller bearings 208a compared to the roller bearings 208a at the second end 220, for example, in an instance where two parallel sets of roller bearings 208a are provided at the second end 220. According to an embodiment, the bearing housing assemblies 208 may be fitted over either the first mounting shaft 210 or the second mounting shaft 212 and slid into contact with an inner circumferential surface 201 of the roller tube 202. According to an embodiment, the bearing housing assemblies 208 may be press fitted through the first opening 214 and the second opening 216 on to the roller tube 202 at the first end 218 and the second end 220 and the bearing housing assemblies 208 may include a third openings 214a, 216a at the first end 218 and the second end 220 sized in a manner to receive the first mounting shaft 210 and the second mounting shaft 212 respectively. In some examples, the roller bearings 208a of the bearing housing assembly 208 at the first end 218 and the second end 220 are fitted with a clearance with corresponding first mounting shaft 210 and second mounting shaft 212. In some examples, the clearance may be provided by including an additional sealing member (not shown) to physically separate the first mounting shaft 210 and second mounting shaft 212 from the roller bearings 208a.

In some embodiments, a drive assembly 204 may be used to transfer torque from the motor to the roller tube 202. The drive assembly 204 of an example embodiment may include a drive member 205, a connector 209 and a sleeve 211. In the example embodiment, the drive assembly 204 is positioned adjacent to the motor assembly 206 in the roller tube 202. The drive member 205 is a torque transmitting member which may be configured to be assembled inside the roller tube 202. In some embodiments, the drive member 205 may include at least one drive pin opening 223 and the roller tube 202 includes at least one roller pin opening 224. In such an embodiment, a connector pin 222 engages both the drive pin opening 223 and the roller pin opening 224 to rotationally lock the drive member 205 relative to the roller tube 202. In some embodiments, the drive member 205 and the roller tube 202 may be attached together using fasteners, a friction connection, and/or crimping of the roller tube along with the drive assembly. The drive member 205, for example, acts like a coupling device which is designed to transmit a torque to the inner circumferential surface 201 of the roller tube 202 through one or more connector pins 222. As used herein, the connector pins 222 may be pins press-fit into the corresponding openings 223, 224, may be set screws threaded into the openings 223, 224, or may be other known attachment means.

Figure 3A:
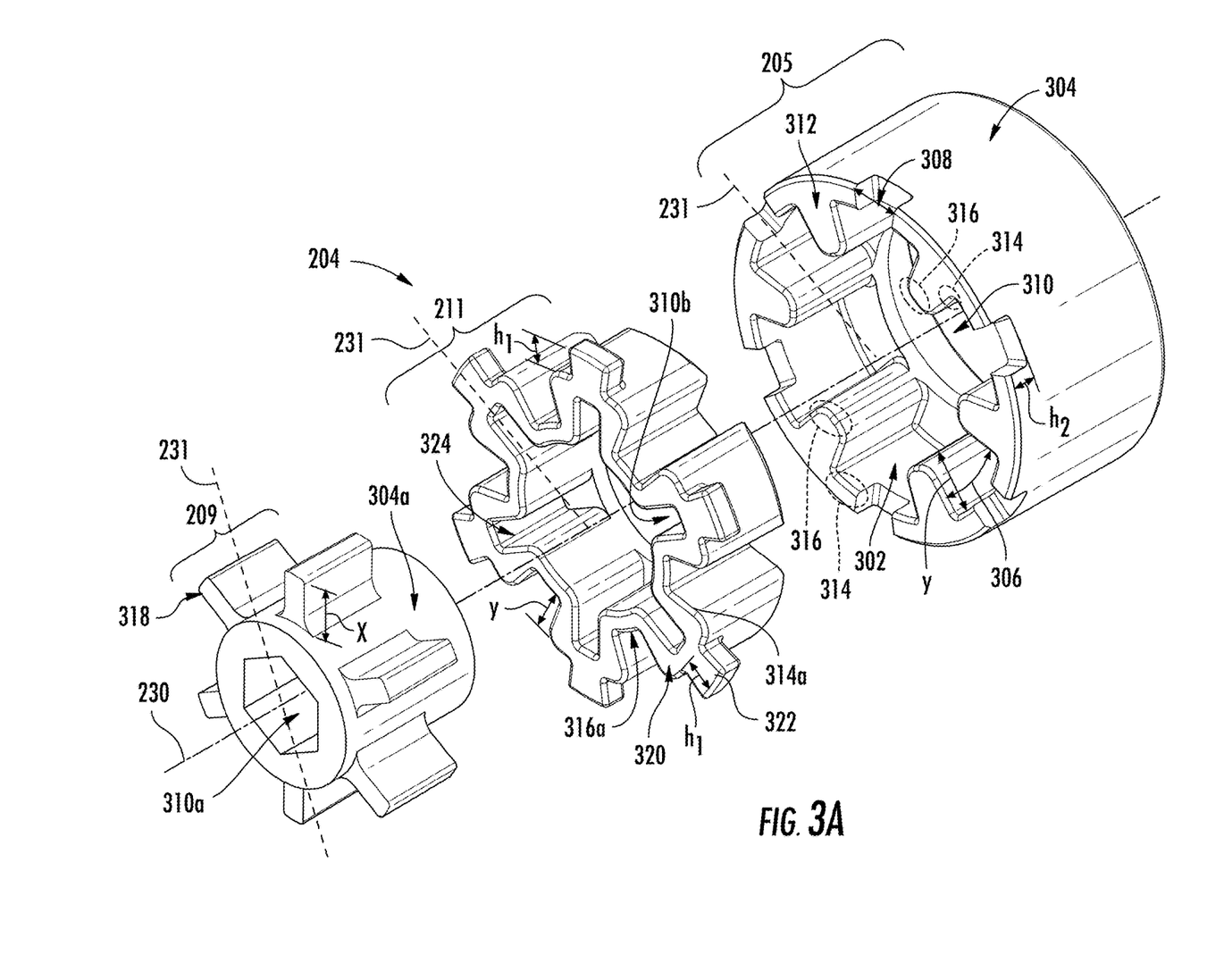
FIG. 3A illustrates an exploded view of a drive assembly of the motorized conveyor roller of FIG. 2, in accordance with one or more embodiments of the present disclosure.

The connector 209 includes an axial opening 310a (as shown in FIG. 3A) through which the motor shaft 207 is engaged to the drive assembly 204. As discussed herein, the connector 209 includes a plurality of projections 318 for imparting torque onto the sleeve 211 and drive member 205. The sleeve 211 may be disposed at least partially between the connector 209 and the drive member 205, such that force applied to the sleeve by the connector 209 is imparted onto the drive member 205 and vice versa. In some examples, the sleeve 211 is provided to align a rotation axis 230 of the motor shaft 207 with a center of the drive assembly 204 by undergoing small deformation to overcome any misalignment when assembling the one or more components of the motorized conveyor roller 102.

In some examples, the one or more connector pins 222 may be configured to withstand the torsional, loading, and frictional forces experienced by the drive assembly 204 and roller tube 202. The sleeve 211 is configured to transmit the torque between the connector 209 and the drive member 205. In some embodiments, at least a portion of the sleeve 211 (e.g., a portion of third projections 322) also extends radially outwardly of the drive member 205, such that the portion of the sleeve 211 is configured to engage the inner circumferential surface 201 of the roller tube 202. In such embodiments, the drive member 205 may have a diameter that is less than an inner diameter of the roller tube 202 to slide freely into and out of the roller tube, while the sleeve 211 engages the inner surface 201 of the roller tube 202 to hold the drive assembly 204 in place. The sleeve 211, for example, is made of an elastomeric material. The drive member 205, the connector 209 and the sleeve 211 may each include one or more projections and/or one or more slots that engage with each other such that the drive member 205, the connector 209 and the sleeve 211 are circumferentially aligned and disposed along a radial axis (e.g., radial axis 231 shown in FIG. 3A) perpendicular the rotation axis of the motor shaft 207, such that each of the connector 209, sleeve 211, and drive member 205 radially overlap with each other to efficiently transfer the torque of the motor. In some embodiments, the sleeve 211 defines a density that is less than a density of the drive member 205 and a density of the connector 209. During operation, the sleeve 211 is interference fit within the roller tube 202, and the drive member 205 defines a diameter less than a diameter of the sleeve 211 and less than the diameter of the inner circumferential surface 201 of the roller tube 202.

When assembling the motorized conveyor roller 102, the first mounting shaft 210 may be inserted into apertures provided on the first rail 106 of the conveyor bed 100 while the second mounting shaft 212 may be depressed by the aid of the spring 212a and inserted into the apertures provided on the second rail 108 of the conveyor bed 100. The first mounting shaft 210 and the second mounting shaft 212 may project non-rotatably into the apertures to mount the motorized conveyor roller 102 to the conveyor bed 100.

When operating the motorized conveyor roller 102, the motor assembly 206 may be switched on with the aid of the electrical conductor means 210a passing through the first mounting shaft 210. The motor assembly 206 which may include the motor and the gear reducer converts electrical energy into rotational force or torque. The torque may be transmitted to the motor shaft 207 of the motor assembly 206 through the gear reducer. The motor shaft 207 is engaged to the drive assembly 204, which in turn drives the roller tube 202 through the connector pin 222.

FIG. 3A illustrates an exploded view of a drive assembly of the motorized conveyor roller of FIG. 2, in accordance with one or more embodiments of the present disclosure. The drive assembly 204 is configured to engage with the motor assembly 206 and the roller tube 202 to transmit torque between the motor assembly 206 and the roller tube 202 as described herein. The drive assembly 204 includes a drive member 205, a connector 209, and a sleeve 211 according to some embodiments described herein. In the depicted embodiment, the drive member 205 is a radial member with a radial inner surface 302 and a radial outer surface 304. The drive member 205 may include one or more first slots 306, one or more second slots 308, and a first axial opening 310. In some embodiments, the first slots 306 and/or the second slots 308 may axially extend from a front face 312 of the drive member 205 towards a rear face (not shown) of the drive member 205. Each of the second slots 308 may be positioned radially outwardly relative to each of the first slots 306 and may connect each of the first slots 306 and/or the inner surface 302 with the radially outward surface 304 of the drive member 205. The first slots 306 may be defined by first plural pairs of crest portions 314 and first plural pairs of trough portions 316 disposed alternately on the radial inner surface 302 of the drive member 205. In some embodiments, the second slots 308 may be formed at a circumferential position of the first plural pairs of crest portions 314 and may extend from the inner surface 302 to the outer surface 304. According to an embodiment, each first slots 306 may be defined by one crest portion 314 and two trough portions 316, with a second slot 308 formed at the one crest portion 314. According to an embodiment, the first plural pairs of crest portions 314 and trough portions 316 may be uniformly distributed alternatively on the front face 312 of the drive member 205. In some embodiments, the slots 306, 308 may extend partially through the axial length of the drive member 205, such that the connector 209 and sleeve 311 are retained at their proper position during assembly. According to an embodiment, the first plural pairs of crest portions 314 may extend to the radially outward surface 304 of the drive member 205 (e.g., via second slots 308) and the first plural pairs of trough portions 316 may extend alternatingly between the crest portions 314 at the radial inner surface 302 of the drive member 205.

The connector 209 may include a second axial opening 310a and one or more first projections 318 extending radially outwardly from an outer surface 304a of the connector 209. The diameter of the second axial opening 310a being smaller than the first axial opening 310. The second axial opening 310a of the connector 209 may receive at least a portion of the motor shaft 207 to receive the torque from the motor. According to an embodiment, the second axial opening 310a may be hexagonally shaped to allow torque to be applied by the motor shaft without slipping.

The sleeve 211 may be disposed at least partially between the connector 209 and the drive member 205 and is configured to transmit the torque between the connector 209 and the drive member 205. According to an embodiment, the sleeve 211 is an elastomer material. The sleeve 211 defines a density that is less than a density of the drive member 205 and a density of the connector 209. In an example, the sleeve 211 is interference fit within the roller tube 202. In some embodiments, the sleeve 211 may include one or more second projections 320, one or more third projections 322, one or more third slots 324, and a third axial opening 310b. According to an embodiment, the one or more second projections 320 includes second one or more crest portions 314a and trough portions 316a disposed alternately about the sleeve 211. The crest portions 314a and trough portions 316a of the sleeve 211 may be configured to align with the corresponding crest portions 314 and trough portions 316 of the drive member 205. According to an embodiment, the one or more third projections 322 are formed on each of the second plural pairs of crest portions 314a of the one or more second projections 320. Each of the third projections 322 may extend radially outwardly away from the third axial opening 310b. In some embodiments, the one or more third slots 324 may be formed into the one or more second projections 320 from the radially-inward side.

According to an embodiment, the drive member 205, the connector 209 and the sleeve 211 may be inserted into engagement (e.g., press fit) with each other prior to insertion into the roller tube to form the drive assembly 204. In an instance in which the drive member 205, the connector 209 and the sleeve 211 are engaged with each other, the one or more first projections 318 of the connector 209 may engage the one or more third slots 324 of the sleeve 211, the one or more second projections 320 of the sleeve 211 may engage the one or more first slots 306 of the drive member 205 and the one or more third projections 322 of the sleeve 211 may be engage with the one or more second slots 308 of the drive member 205. The one or more first projections 318, the one or more second projections 320, the one or more third projections 322, the one or more first slots 306, the one or more second slots 308 and the one or more third slots 324 may be circumferentially aligned along one or more respective radial axes 231 perpendicular to the rotational axis 230 of the motor shaft 207 within a plane perpendicular to the axis 230 of the motor and drive assembly. According to another embodiment, when the drive member 205, the connector 209 and the sleeve 211 are engaged with each other, a portion of the sleeve 211 (e.g., a portion of the third projections 322) may extend radially outwardly of the drive member 205, such that the portion of the sleeve 211 is configured to engage the inner circumferential surface 201 of the roller tube 202. In some examples, the portion of the sleeve 211 includes a portion of the one or more third projections 322 which extends radially outwardly away from the second axial opening 310a of the connector 209 and the third axial opening 310b of the sleeve 211. In some examples, the one or more second slots 308 is configured to receive the portion of the sleeve 211 therein.

According to another embodiment, when the drive member 205, the connector 209 and the sleeve 211 are engaged with each other, the one or more first projections 318 on the connector 209 and the one or more third slots 324 on the sleeve 211 are disposed at same radial height "x" and further the one or more second projections 320 on the sleeve 211 and the one or more first slots 306 on the drive member 205 are disposed at same radial height "y". According to another embodiment, when the drive member 205, the connector 209 and the sleeve 211 are press fitted with each other, the radial height "h1" of the one or more third projections 322 on the sleeve 211 is greater than the radial height "h2" of the one or more second slots 308 on the drive member 205. In some embodiments, the radial height "x" of the connector 209 may be greater than or equal to a radial distance between the axis 230 and the radially-inward edge of the trough(s) 316 of the drive member 205, such that the torque from the motor may be efficiently transferred from the connector 209 to the drive member 205 without shearing or breaking the sleeve 211. In such embodiments, the sleeve 211 may not be required to transfer force between the connector 209 and the drive member 205.

Figure 3B:
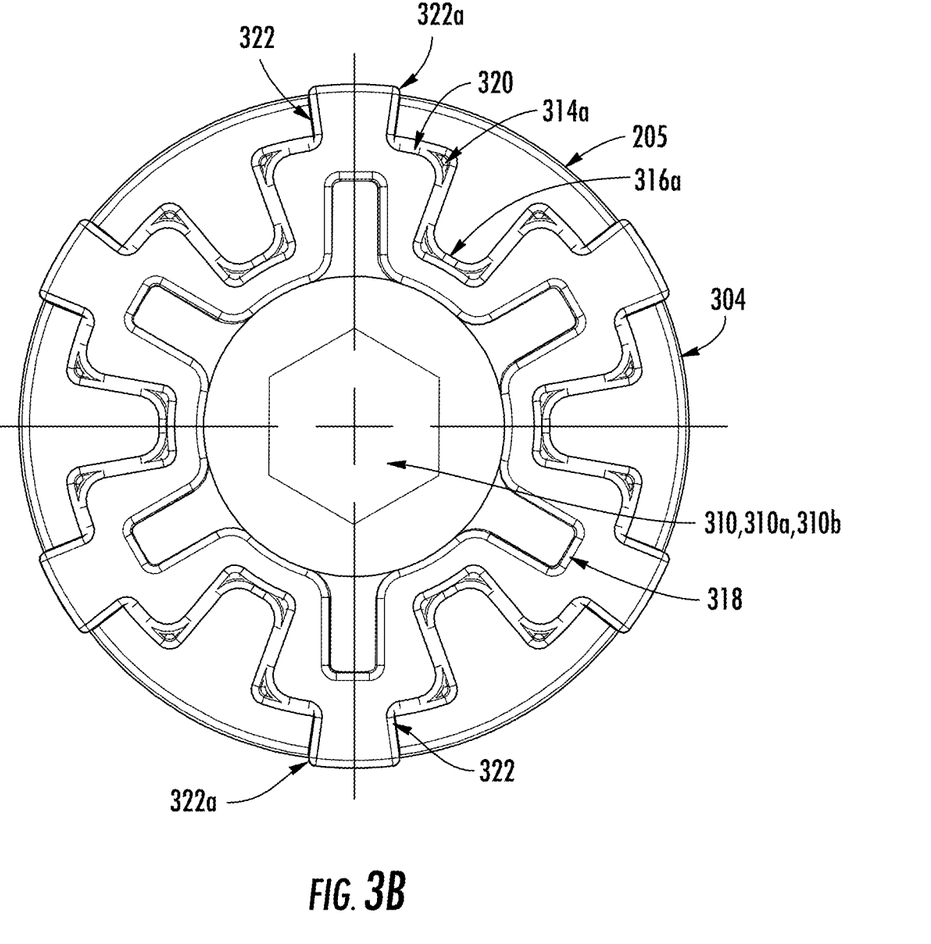
FIG. 3B illustrates a front elevation view of the drive assembly of FIG. 2 showing radially extending projections, in accordance with one or more embodiments of the present disclosure

FIG. 3B illustrates a front elevation view of a drive assembly, such as the drive assembly 204 of FIG. 2, showing radially extending projections, in accordance with one or more embodiments of the present disclosure. In the embodiment of FIG. 3B, the one or more first projections 318, the one or more second projections 320 and the one or more third projections 322 along with axial openings 310, 310a, and 310b appear to resemble toothed sprocket. As shown in FIG. 3B, the one or more first projections 318 (e.g., six total sets of corresponding projections in FIG. 3B) are disposed within the one or more slots 324 in the one or more second projections 320, and the one or more third projections 322 are disposed on the one or more second projections 320. The one or more third projections 322 are formed on the one or more second projections 320, for example, on the crest portions 314a of the second projections 320. The one or more third projections 322 extend radially from the outward surface 304 of the drive member 205. For example, the one or more third projections 322 includes a integrally formed radially extending portion 322a that makes a contact with the inner circumferential surface 201 of the roller tube 202 and provides an interference fit for the drive assembly 204 with the roller tube 202. As described above, this interference fit may, in some embodiments, be used to hold the drive assembly 204 in place during assembly of the motorized roller (e.g., prior to insertion of the pins). In some examples, the radially extending portion 322a is the integral portion of the third projection 322 which extends radially outward from the outer surface 304 of the drive member 205 when the connector 209, sleeve 211, and the drive member 205 are engaged with each other. The radially extending portion 322a of the one or more third projections 322 is capable of absorbing a shock load which may be transmitted by the motorized conveyor roller 102 during acceleration and deceleration. The radially extending portion 322a, for example, is an elastomer material (e.g., the same material as the sleeve 211) which deforms to facilitate ease of insertion of the drive assembly 204 without any excessive force being applied to its components and the drive assembly may be easily slid thorough the roller tube 202 and placed in a desired position. The radially extending portion 322a, via the interference fit, holds the drive assembly 204 resiliently to allow the drive assembly to be inserted without falling out of the roller tube 202 or shifting its position during assembly.

Figure 4:
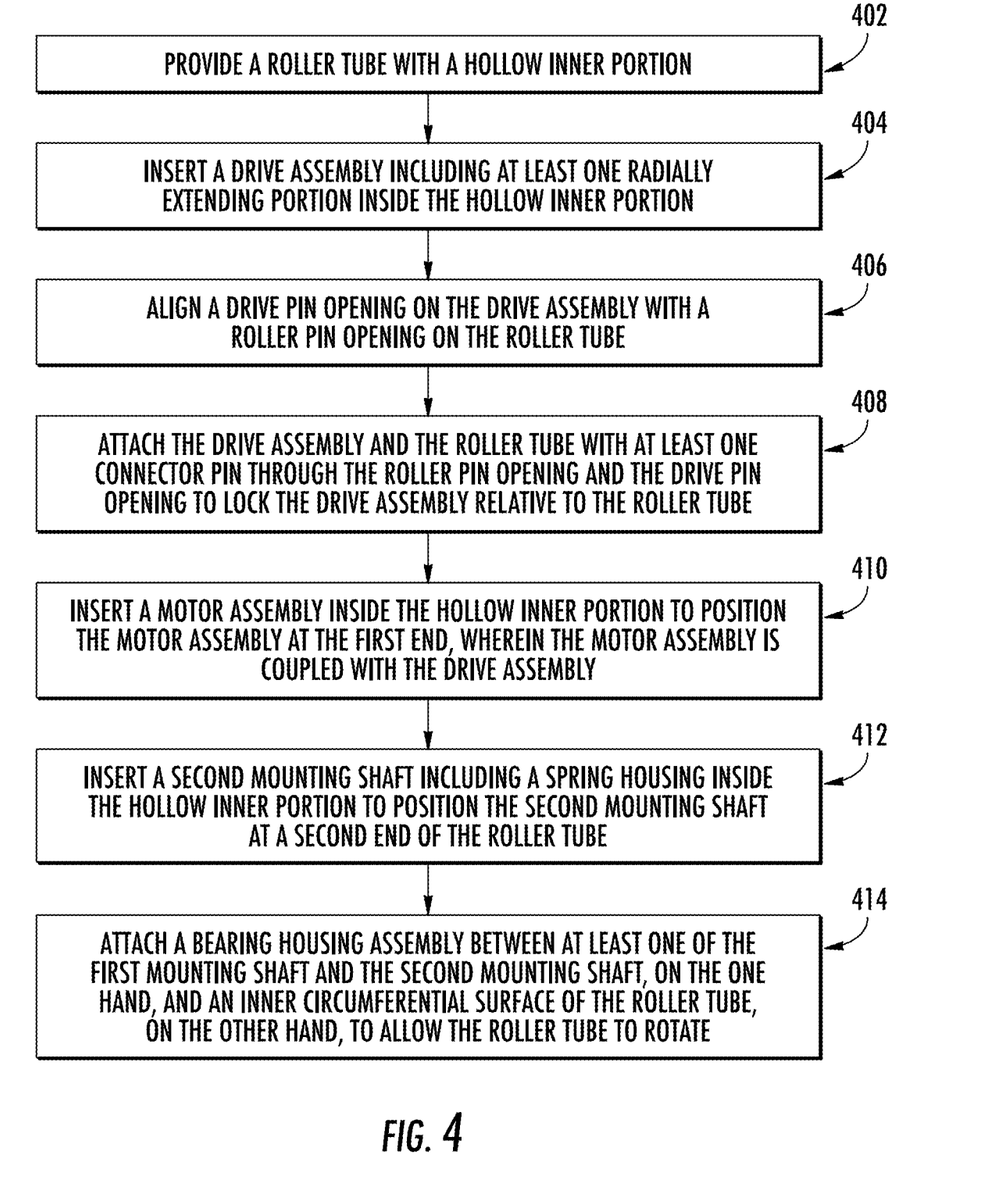
FIG. 4 is a flowchart illustrating a method of assembling components of a motorized conveyor roller, in accordance with one or more embodiments of the present disclosure.

FIG. 4 illustrates one example method of assembling components of a motorized conveyor roller, in accordance with one or more embodiments of the present disclosure. The components of the motorized conveyor roller, for example, includes roller tube, drive assembly, motor assembly, bearing housing assembly and mounting shafts. According to an embodiment, these components are assembled during manufacture. Alternatively, these components may be assembled during installation. According to another embodiment few of these components may be assembled during manufacture and the other components during installation. During installation, an operator may assemble these components in a sequential manner to ensure that each of these components are fixed in unison as a compact assembly. The operator, for example, may use guiding fixtures to assemble the components at a desired position. At step 402, a roller tube with a hollow inner portion is provided (e.g., positioned in the assembly area and/or supplied by a manufacturer). In an example, the roller tube may include one or more components assembled in the roller tube. In other examples, the roller tube may a hollow cylindrical tube with hollow space on the inner portion and devoid of any components. At step 404, drive assembly including a radially extending portion is inserted into the hollow portion. The drive assembly is slid inside the hollow inner portion from a first end of the roller tube. The drive assembly as previously discussed in conjunction with FIGS. 3A and 3B includes the radially extending portion on a sleeve which facilitates the drive assembly to be engaged with the roller tube as an interference fit. The sleeve (e.g., sleeve 211 shown in FIGS. 2-3B) may temporarily hold the drive assembly in position until the pins are inserted. According to an embodiment, a portion of the sleeve defines the radially extending portion, The drive assembly may be inserted into the roller tube, for example, through the guiding fixture. The radially extending portion may allow alignment and temporary fixation of the drive assembly at a desired position inside the roller tube. Additionally, the drive assembly includes a drive member and a connector. The drive member includes a first slot axially extending from a front face of the drive member towards a rear face of the drive member. The connector includes an axial opening and at least one first projection extending radially outwardly. The axial opening receives a motor shaft. The sleeve is disposed at least partially between the connector and the drive member, the sleeve is configured to engage the first slot of the drive member and the at least one first projection of the connector. The sleeve is configured to transmit the torque between the connector and the drive member, After the drive assembly is aligned at the desired position, at step 406, the drive pin opening and the roller pin opening are aligned. The roller pin opening is drilled on the outer circumferential surface of the roller tube and a drive pin opening is drilled on the drive assembly, for example, on an outer surface of the drive member, which openings may be pre-formed in the material or added (e.g., via drilling) during assembly. The roller pin opening and the drive pin opening may be aligned parallel with each other in a radial axis perpendicular to the rotational axis of the roller tube. Further, at step 408, a connector pin is attached to the drive pin opening trough the roller pin opening to lock the drive assembly with the roller tube. In some embodiments, additional connector pins are inserted for each pair of corresponding drive pin openings and roller pin openings. In some examples, the connector pin is press fitted through the drive pin opening and the roller pin opening. In some examples, the connector pin is threaded into the drive pin opening and/or the roller pin opening.

At step 410, the motor assembly is inserted inside the hollow inner portion of the roller tube. The motor assembly may be inserted through the first end of the roller tube. The motor assembly may include the motor shaft which couples with the drive assembly, for example, with the axial opening of the connector of the drive assembly. The motor assembly may thereby be configured for transmitting required torque to the drive assembly through the motor shaft. Further, the motor assembly includes a first mounting shaft. The first mounting shaft may be inserted from a first end of the roller tube. The first mounting shaft may be mechanically coupled with the motor assembly through one or more fasteners or fastening means (e.g., welding, integral formation, etc.), either prior to insertion or after. The first mounting shaft includes an electrical conductor means which protrudes out of the first mounting shaft away from the roller tube. The first mounting shaft along with the electrical conductor means is fitted with an outer face of the motor assembly facing the first end. At step 412, a second mounting shaft including a spring housing is inserted inside the hollow inner portion to position the second mounting shaft at a second end of the roller tube. The second mounting shaft is inserted from a second end of the roller tube. The second mounting shaft includes a spring housing with a spring positioned at one end of the second mounting shaft. The second mounting shaft along with the spring housing is inserted into the roller tube. The springs are provided for easy insertion and removal of the motorized conveyor roller from the conveyor frame. In some examples, during installation, the second mounting shaft is depressed by the action of the spring and then inserted into rails of the conveyor frame and during removal for maintenance, the second mounting shaft is depressed by the action of the spring and then removed from the rails of the conveyor frame. The first mounting shaft and the second mounting shaft may each be non-rotatably disposed in the roller tube and to the conveyor frame. For example, the shafts may each be rotationally locked to the conveyor frame, such that the roller tube spins along the bearings relative to each shaft and the motor. Further, at step 414, a bearing housing assembly is attached between at least one of the first mounting shaft and the second mounting shaft, on the one hand, and an inner circumferential surface of the roller tube, on the other hand, to allow the roller tube to rotate. The bearing housing assembly is slid on both the first end and the second end of the roller tube. The bearing housing assembly is in contact with an inner circumferential surface of the roller tube at both the first end and the second end. The bearing housing assembly includes bearings that facilitate rotation of the roller tube about its rotational axis.

Figure 5:
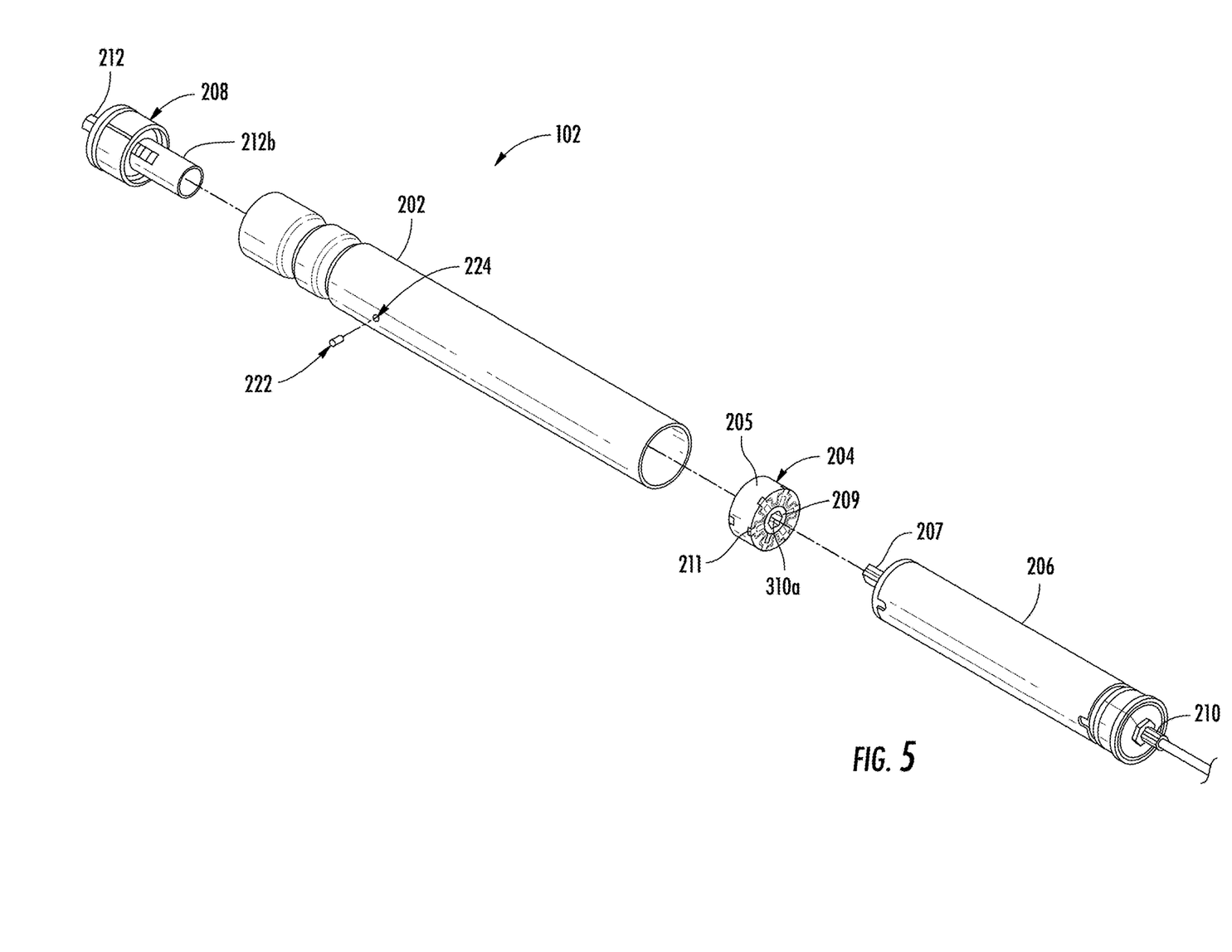
FIG. 5 illustrates an exploded view of a motorized conveyor roller of FIG. 1, in accordance with one or more embodiments of the present disclosure.

FIG. 5 illustrates an exploded view of a motorized conveyor roller of FIG. 1, in accordance with one or more embodiments of the present disclosure. The motorized conveyor roller 102 includes one or more components, such as a roller tube 202, a drive assembly 204, a motor assembly 206, at least one bearing housing assembly 208. The roller tube 202 is a hollow tube through which the drive assembly 204, motor assembly 206 and the at least one bearing housing assembly 208 is inserted. The roller tube 202 includes a roller tube opening 224 through which a connector pin 222 is inserted to lock the drive assembly 204 with the roller tube 202. The drive assembly 204 includes a drive member 205, a sleeve 211, and a connector 209 with axial opening 310a. The motor assembly 206 includes a motor shaft 207 which is in contact with the drive assembly 204 when inserted into the roller tube 202. The motor shaft 207, for example, is engaged with the axial opening 310a of the drive assembly 204. The drive assembly 204 is engaged with the motor assembly 206 and the roller tube 202 to transmit torque between the motor assembly 206 and the roller tube 202. The drive assembly 204 and the motor assembly 206 is inserted from one end of the roller tube 202. Further, the sleeve 211 of the drive assembly 204 includes radially extending portion as described in conjunction with FIGS. 3A and 3B. The radially extending portion contacts inner circumferential surface of the roller tube 202 with an interference fit such that the drive assembly 204 is held intact within the roller tube 202. The sleeve 211 may be formed of a material, such as an elastomer material, that is deformable. Further, a first mounting shaft 210 and a second mounting shaft 212 is provided on opposite ends of the roller tube 202 and held non-rotatably with the roller tube 202. Further a spring housing 212b including at least one spring (not shown) is provided along with the at least one bearing housing assembly 208 and inserted from the other end of the roller tube 202.

The motorized roller assembly may be assembled in various orders and in various subassemblies. For example, the bearings, shafts, and/or motor may be combined into subassemblies prior to insertion into the roller tube. Similarly, the drive assembly may be assembled prior to insertion in the roller tube. In some embodiments, the drive assembly may be disposed on the motor shaft of the motor prior to insertion (e.g., insertion separately with the motor or as part of one of the aforementioned subassemblies). In some embodiments, all or some of the components may be inserted into the roller tube separately.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation. In addition, it should be understood that the figures, which highlight the structure, methodology, functionality and advantages of the present disclosure, are presented as examples only. The present disclosure is sufficiently flexible and configurable, such that it may be implemented in ways other than that shown in the accompanying figures.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements are equally contemplated by the present disclosure.

The invention claimed is:
1. A conveyor roller comprises:
a roller tube;
a motor assembly comprising a motor and a motor shaft; and
a drive assembly engaged with the motor assembly and the roller tube to transmit torque between the motor assembly and the roller tube; wherein the drive assembly comprises:
a drive member comprising at least one first slot, wherein the at least one first slot axially extends from a front face of the drive member towards a rear face of the drive member;
a connector comprising an axial opening and at least one first projection extending radially outwardly, wherein the axial opening receives the motor shaft; and
a sleeve disposed at least partially between the connector and the drive member, wherein the sleeve is configured to engage the at least one first slot of the drive member and the at least one first projection of the connector, and wherein the sleeve is configured to transmit the torque between the connector and the drive member, wherein a portion of the sleeve extends radially outwardly of the drive member and protrudes out of at least one second slot of the drive member, such that the portion of the sleeve is configured to engage an inner surface of the roller tube.

2. The conveyor roller as claimed in claim 1, wherein the at least one second slot extends from an inner cavity of the drive member to a radially outward surface of the drive member, and wherein the at least one second slot is configured to receive the portion of the sleeve therein.

3. The conveyor roller as claimed in claim 2, wherein the at least one second slot axially extends from the front face of the drive member towards the rear face of the drive member, wherein the at least one second slot is positioned radially outwardly relative to the at least one first slot and connects the at least one first slot with the radially outward surface of the drive member.

4. The conveyor roller as claimed in claim 1, wherein the sleeve further comprises at least one second projection, wherein the at least one second projection is configured to engage the at least one first slot of the drive member.

5. The conveyor roller as claimed in claim 4, wherein the at least one second projection comprises a plurality of second projections, wherein the plurality of second projections includes second plural pairs of crest portions and trough portions disposed alternately about the sleeve.

6. The conveyor roller as claimed in claim 5, wherein the portion of the sleeve comprises a plurality of third projections formed on each of the crest portions of the plurality of second projections.

7. The conveyor roller as claimed in claim 4, wherein the portion of the sleeve comprises at least one third projection, wherein the at least one third projection extending radially outwardly away from the axial opening of the connector.

8. The conveyor roller as claimed in claim 7, wherein the sleeve further comprises at least one third slot configured to engage the at least one first projection of the connector, wherein the at least one second slot of the drive member is configured to engage the at least one third projection, and wherein respective ones of the at least one first projection, the at least one third slot, the at least one second projection, the at least one first slot, the at least one third projection, and the at least one second slot are circumferentially aligned along a radial axis.

9. The conveyor roller as claimed in claim 1, further comprising at least one pin, wherein the drive member comprises at least one drive pin opening and wherein the roller tube comprises at least one roller pin opening, and wherein the at least one pin engages both the at least one drive pin opening and the at least one roller pin opening to rotationally lock the drive member relative to the roller tube.

10. The conveyor roller as claimed in claim 1, wherein the at least one first slot comprises a plurality of first slots that include first plural pairs of crest portions and trough portions disposed alternately on a radial inner surface of the drive member.

11. The conveyor roller as claimed in claim 10, further comprising a plurality of second slots formed on each of the crest portions of the plurality of first slots.

12. The conveyor roller of claim 1, wherein the sleeve defines a density that is less than a density of the drive member and more than a density of the connector.

13. The conveyor roller of claim 1, wherein the sleeve is interference fit within the roller tube, and wherein the drive member defines a diameter less than a diameter of the sleeve and less than diameter of the inner surface of the roller tube.

14. The conveyor roller of claim 1, wherein at least a portion of the drive member and at least a portion of the connector are disposed at a same radial distance within a plane perpendicular to an axis of the drive assembly.

15. A drive assembly engaged with a motor assembly and a roller tube to transmit torque between the motor assembly and the roller tube; wherein the drive assembly comprises:
a drive member comprising at least one first slot, wherein the at least one first slot axially extends from a front face of the drive member towards a rear face of the drive member;
a connector comprising an axial opening and at least one first projection extending radially outwardly, wherein the axial opening receives a motor shaft; and
a sleeve disposed at least partially between the connector and the drive member, wherein the sleeve is configured to engage the at least one first slot of the drive member and the at least one first projection of the connector, and wherein the sleeve is configured to transmit the torque between the connector and the drive member,
wherein a portion of the sleeve extends radially outwardly of the drive member and protrudes out of at least one second slot of the drive member, such that the portion of the sleeve is configured to engage an inner surface of the roller tube.

16. The drive assembly as claimed in claim 15, wherein the at least one second slot extends from an inner cavity of the drive member to a radially outward surface of the drive member, and wherein the at least one second slot is configured to receive the portion of the sleeve therein.

17. The drive assembly as claimed in claim 16, wherein the at least one second slot axially extends from the front face of the drive member towards the rear face of the drive member, wherein the at least one second slot is positioned radially outwardly relative to the at least one first slot and connects the at least one first slot with the radially outward surface of the drive member.

18. The drive assembly as claimed in claim 15, wherein the sleeve further comprises at least one second projection, wherein the at least one second projection is configured to engage the at least one first slot of the drive member.

19. The drive assembly as claimed in claim 18, wherein the at least one second projection comprises a plurality of second projections, wherein the plurality of second projections includes second plural pairs of crest portions and trough portions disposed alternately about the sleeve.

20. The drive assembly as claimed in claim 19, wherein the portion of the sleeve comprises a plurality of third projections formed on each of the crest portions of the plurality of second projections.

21. The drive assembly as claimed in claim 18, wherein the portion of the sleeve comprises at least one third projection, wherein the at least one third projection extending radially outwardly away from the axial opening of the connector.

22. The drive assembly as claimed in claim 21, wherein the sleeve further comprises at least one third slot configured to engage the at least one first projection of the connector, wherein the at least one second slot of the drive member configured to engage the at least one third projection, and wherein respective ones of the at least one first projection, the at least one third slot, the at least one second projection, the at least one first slot, the at least one third projection, and the at least one second slot are circumferentially aligned along a radial axis.

23. The drive assembly as claimed in claim 15, wherein the at least one first slot comprises a plurality of first slots that include first plural pairs of crest portions and trough portions disposed alternately on a radial inner surface of the drive member.

24. The drive assembly as claimed in claim 23, further comprising a plurality of second slots formed on each of the crest portions of the plurality of first slots.

25. The drive assembly as claimed in claim 15, wherein the sleeve defines a density that is less than a density of the drive member and more than a density of the connector.

26. The drive assembly as claimed in claim 15, wherein at least a portion of the drive member and at least a portion of the connector are disposed at a same radial distance within a plane perpendicular to an axis of the drive assembly.

27. A method of assembling a conveyor roller comprising:
providing a roller tube with a hollow inner portion;
inserting a drive assembly including at least one radially extending portion inside the hollow inner portion;
aligning a drive pin opening on the drive assembly with a roller pin opening on the roller tube;
attaching the drive assembly and the roller tube with at least one connector pin through the roller pin opening and the drive pin opening to lock the drive assembly relative to the roller tube;
inserting a motor assembly inside the hollow inner portion to position the motor assembly at a first end of the roller tube, wherein the motor assembly is coupled with the drive assembly, wherein the motor assembly includes a first mounting shaft;
inserting a second mounting shaft including a spring housing inside the hollow inner portion to position the second mounting shaft at a second end of the roller tube; and
attaching a bearing housing assembly between at least one of the first mounting shaft and the second mounting shaft, on the one hand, and an inner circumferential surface of the roller tube, on the other hand, to allow the roller tube to rotate.

28. The method of claim 27, further comprising:
assembling the drive assembly by:
providing a drive member, the drive member comprising at least one first slot, wherein the at least one first slot axially extends from a front face of the drive member towards a rear face of the drive member;
providing a connector, the connector comprising an axial opening and at least one first projection extending radially outwardly, wherein the axial opening receives a motor shaft to couple the drive assembly with the motor assembly;
disposing a sleeve at least partially between the connector and the drive member, wherein the sleeve is configured to engage the at least one first slot of the drive member and the at least one first projection of the connector, and wherein the sleeve is configured to transmit the torque between the connector and the drive member,
wherein a portion of the sleeve defines the at least one radially extending portion extends.

* * * * *